Nov. 10, 1970   R. J. PURTELL   3,538,691
SEED HARVESTING AND SEPARATING METHOD
Filed June 28, 1965

INVENTOR:

Rufus J. Purtell

BY:

United States Patent Office 3,538,691
Patented Nov. 10, 1970

3,538,691
SEED HARVESTING AND SEPARATING METHOD
Rufus J. Purtell, 1217 E. Tate,
Brownfield, Tex. 79316
Filed June 28, 1965, Ser. No. 467,549
Int. Cl. A01d 41/08
U.S. Cl. 56—126                            6 Claims

ABSTRACT OF THE DISCLOSURE

Seed which are encased in husks such as grain sorghum seed are freed from the husk by subjecting the seed to pressure from an air inflated rubber roller. The rubber roller contacts the seed and as additional pressure is applied to the husk, the stretching of the rubber, due to the pressure, causes the husk to move in relationship to the seed thus breaking any bond between the husk and the seed and freeing the seed from the husk. After the seed is freed from the husk, it will be separated by conventional equipment.

---

Figure 1:
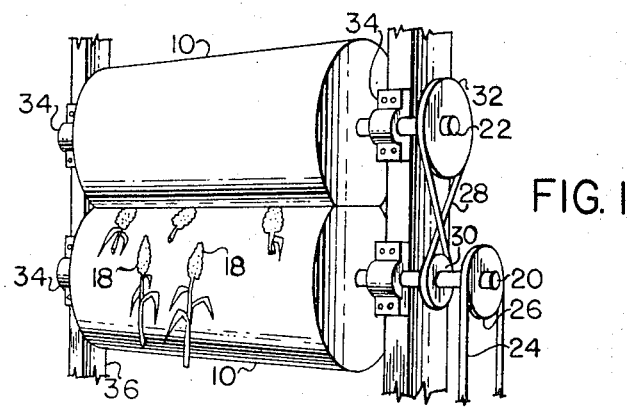

This invention relates to harvesting of crops and particularly to separating hard seeds from husks within which they are at least partially enclosed.

Since the domestication of grain, man has thrashed the grain by flailing to release the grain from its husk. In earlier primitive times the heads of grain were cut and brought to a thrashing floor for this operation. In later times a single machine combined the operation of cutting the grain, separating the kernels from the husk, and winnowing. However, the basic release of the grain from its husk was characterized by an impact of thrashing—often with the undesirable result of cracked kernels. If the grain is to be used for planting seed, many of the kernels not cracked by the impact have poor germinating qualities as a result of the impact.

According to this invention, the seed is separated from its husk by being rolled between soft, elastic, pliant, supple rollers which are filled with air. The entire head of grain is passed through the rollers. As the roller first contacts the husk around the arcuate shaped seed it makes frictional contact with the husk. As the seed proceeds through the roller, with a greater pressure from the roller, the surface of the roller envelops the husk. There is a certain stretching action of the surface of the roller as it envelops the seed.

Inasmuch as the husk is inelastic, the stretching surface of the roller envelops the husk. There is a certain stretching action of the surface of the roller as it envelops the seed. Inasmuch as the husk is inelastic, the stretching surface in frictional contact with the husk will free the seed from the husk. If the seed is only partially enclosed in the husk, this freeing will be by pulling the husk back away from the seed. However, if the seed is completely enclosed within the husk, the husk will rupture and free the seed. After the seed is freed from the husk, the two may be separated by conventional means and methods.

As used herein the term "seed" means generally the hard fruit of grasses or legumes or other plants and is not used in a strict botanical sense. Specifically the term includes the caryopsis of grasses and the beans and peas of legumes. The term "husk" is used herein to include the fibrous part which attaches the seed to the stalk by enveloping at least a portion of the seed. Specifically included are the glume of grasses and the pods of legumes.

Although specifically included within this and mentioned herewith nearly all the grasses such as wheat rye, barley, oats, millets, and sorghums; and legumes such as common cow peas, mung beans, English peas, castor beans, alfalfa and the like; this application is in no wise limited except by the concept that it operates on any hard seed which is at least partially enclosed by husk to free the seed from the husk. However, it would not be used for shelling nuts. Furthermore specifically excluded is maize (also known as Indian corn) inasmuch as each kernel of the grain is not enclosed and held to the stalk by a husk.

An object of this invention is to harvest seed crops.
Another object is to free seed crops from their husk for later separation.
Another object of this invention is to separate hard seed from their husk without the impact and rough treatment involved with flailing and other thrashing methods.
Still further objects are to achieve the above with a device that is sturdy, compact, durable, simple, versatile and reliable, yet inexpensive and easy to manufacture and operate.
Still further objects are to achieve the above with a method that is rapid, inexpensive, and does not require skilled people to adjust and operate.

Figure 2:
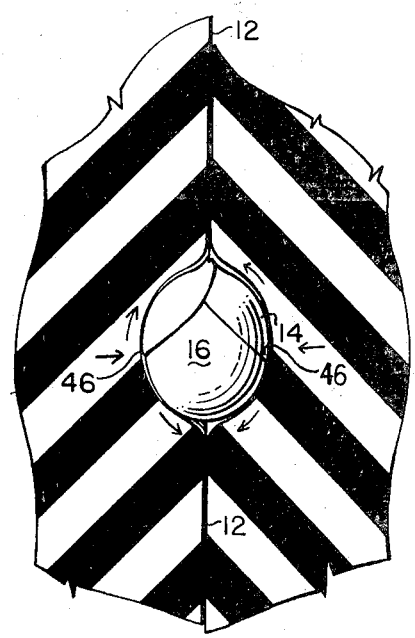
Figure 3:
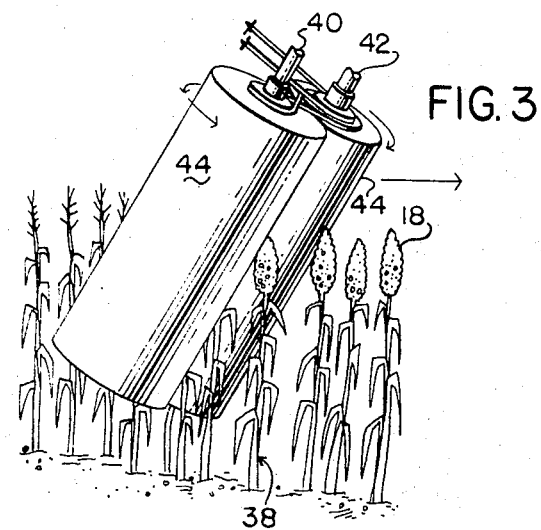

The specific nature of the invention as well as other objects, uses, and advantages thereof will clearly appear from the following description and from the accompanying drawing, the different views of which are not to the same scale in which:

FIG. 1 is a perspective view somewhat schematic illustrating a simple device according to my invention.
FIG. 2 is a greatly enlarged portion showing the action of the rollers on a single kernel of grain.
FIG. 3 is an illustration of part of a machine used for harvesting, somewhat schematic in nature.

The drawings specifically show the separation of sorghum grain from its husk.

Referring to FIGS. 1 and 2, rollers 10 are constructed of rubber and are air inflated. Such rollers are available upon the market and are known commercially as "Rollagons." Describing the rollers 10 more particularly they are cylindrical rollers with an axial length greater than the diameter. The covering is rubber over the annular interior filled with air. The rubber forms a surface which is elastic, resilient, supple, soft, pliant, and frictional. It is necessary that there be a frictional contact between the surface 12 of the roller and the husk 14 of the seed 16. The rollers 10 are mounted in contacting parts between which the sorghum heads 18 are fed. The rollers are mounted on shafts 20 and 22.

The shaft 20 is rotated by drive belt 24 operating upon pulley 26. The other shaft 22 is rotated by cross belt 28 which runs between pulley 30 on shaft 20 and pulley 32 on shaft 22. The rollers may be operated without the belt 28 inasmuch as the frictional contact between the rollers 10 themselves will cause the undriven roller to rotate. However, it is preferred to operate as illustrated inasmuch as pulley 30 is slightly smaller than pulley 32 thus causing the roller 10 upon the shaft 22 to rotate at a slightly slower speed. Therefore in addition to the stretching force caused upon the husk 14 by the elasticity of the surface 12 of the roller 10, there will be an additional shear or tearing on the seed 16 between the two surfaces 12 which are moving at a different rate.

The shafts 20 and 22 are supported by conventional bearings 34 upon structural frame 36 which is only partially shown inasmuch as the construction of frames for machines is well known by all mechanics. The two rollers are mounted rather close together so that there is considerable contact or flattening between the faces of the rollers 10 where they contact. The force upon the seed will be determined by the air pressure within the roller 10. I have found that this may be varied widely and still obtain good results; however, generally pressure in the order of 10 p.s.i.g. are satisfactory. With different crops and different conditions, the pressure, the rotational speed, the differential speed, and the contact between the rollers (as determined by the setting of the bearings 34 upon the frame 36) may all be varied widely.

FIG. 1 illustrates that the heads 18 are severed from the stalk before they are run through the rollers 10. FIG. 3 illustrates the rollers separating the grain from the husk while the head 18 is still upon the stalk 38. Shaft 40 and 42 protrudes only from the top of the rollers 44 which are primarily vertical. The rollers 44 move along a row of crop on either side thereof. The heads 18 upon the stalks 38 extend through the rollers 44 and the seeds are separated from the husk while the husk remains upon the stalk. The seed thus freed are collected by means not involved with this invention and therefore not illustrated.

One of the rollers 44 are slightly ahead of the other so that the seed are thrown to one side of the row after they pass through the rollers. The shafts 40 and 42 of the roller 44 angle forward slightly. After the initial contact of the rollers 44 with the head 18 it is lifted or stretched slightly as it passes through the rollers aiding in the freeing and removal of the seed from the husk.

FIG. 2 illustrates the action which takes place between the rollers 10 or 44. As the nearly spherical seed 16 first comes in contact between the surfaces 12, the seed is first contacted at diametrically opposed points 46. Then the pressure is exerted toward the center of the seed. The pressure is increased as the seed 16 proceeds between the rollers. Due to its elasticity the surface 12 tends to contact more of the surface of the seed and as it does the surface 12 stretches slightly causing a pulling or slipping of the husk from the point of initial contact 46. If the seed is oriented as shown in FIG. 2 the initial contact is at the edge of the husk and the pulling because of the frictional contact between the surface 12 and the husk 14 will result in pulling the husk from the seed.

If the initial contact is along the middle of the husk or if the husk completely encloses the seed, the forces involved will result in a rupture of the husk and an initial tear will appear and then the husk will slip on the seed.

The rollers free the seed from the husk. Even though the seed might be still physically enclosed by a majority of the husk, by conventional winnowing the two are readily separated. Also the seed will fall by gravity from the husk if the husk is still attached to the plant as shown in FIG. 3.

I claim as my invention:

1. The method of freeing a hard seed at least partially enclosed within a husk from that husk comprising: rolling the seed with the husk between rollers constructed of soft, pliant, elastic and resilient material, said rollers rotating at about the same speed.

2. The method of freeing a hard seed which is at least partially enclosed within a husk from that husk comprising: rolling the seed with the husk between rollers which have a supple, elastic covering over a fluid filling, said rollers rotating at about the same speed.

3. The method of freeing grain each kernel of which is at least partially enclosed within a husk from that husk comprising: rolling the entire head of grain between rollers constructed of soft, pliant, elastic, and resilient material, said rollers rotating at about the same speed.

4. The method of freeing grain each kernel of which is at least partially enclosed within a husk from that husk comprising: rolling the entire head of grain between fluid filled supple, elastic, hollow rollers, said rollers rotating at about the same speed.

5. The method of harvesting seed crop composed of individual seed which are at least partially enclosed by a husk comprising: rolling the crop of seed while supported by its stalk between rollers constructed of soft, pliant, resilient, and elastic material, said rollers rotating at about the same speed.

6. The method of harvesting a seed crop consisting of individual seeds at least partially enclosed with a husk comprising: rolling the crop of seed while it is supported by its stalk between fluid filled rollers with a supple, elastic covering, said rollers rotating at about the same speed.

References Cited

UNITED STATES PATENTS

| 1,867,955 | 7/1932  | Ryder      | 130—30   |
| 2,433,730 | 12/1947 | Bridge     | 146—32   |
| 2,771,078 | 11/1956 | Summers    | 130—30   |
| 2,803,254 | 8/1957  | Wood       | 130—30   |
| 2,921,426 | 1/1960  | Heth       | 171—58 X |
| 3,184,904 | 5/1965  | Fiedler    | 56—126   |
| 636,085   | 10/1899 | Temple     | 56—130   |
| 2,958,174 | 11/1960 | Lawson     | 56—15    |
| 3,043,073 | 7/1962  | Bornzin    | 56—1     |
| 3,437,152 | 4/1969  | Barrentine | 171—58   |
| 3,122,144 | 2/1964  | Klemm et al. | 130—30 |

ANTONIO F. GUIDA, Primary Examiner

U.S. Cl. X.R.

56—1; 146—32, 299; 171—58